US 8,750,571 B2

(12) United States Patent
Zuev et al.

(10) Patent No.: US 8,750,571 B2
(45) Date of Patent: *Jun. 10, 2014

(54) METHODS OF OBJECT SEARCH AND RECOGNITION

(71) Applicant: ABBYY Development LLC, Moscow (RU)

(72) Inventors: Konstantin Zuev, Moscow (RU); Diar Tuganbaev, Moscow (RU); Irina Filimonova, Moscow (RU)

(73) Assignee: ABBYY Development LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,616

(22) Filed: Aug. 9, 2013

(65) Prior Publication Data

US 2013/0322773 A1    Dec. 5, 2013

Related U.S. Application Data

(63) Continuation of application No. 12/877,954, filed on Sep. 8, 2010, now Pat. No. 8,571,262, which is a continuation-in-part of application No. 11/556,201, filed on Nov. 3, 2006, now abandoned.

(51) Int. Cl.
*G06K 9/00* (2006.01)
*G06K 9/54* (2006.01)

(52) U.S. Cl.
USPC .......................................... 382/103; 382/305

(58) Field of Classification Search
USPC ................. 382/103, 291, 292, 305, 307; 715/505–508, 900–911, 221–226, 715/243–254
See application file for complete search history.

(56) References Cited

U.S. PATENT DOCUMENTS

| | | |
|---|---|---|
| 5,251,273 A | 10/1993 | Betts et al. |
| 5,317,646 A | 5/1994 | Sang et al. |
| 5,416,849 A | 5/1995 | Huang |
| 5,434,962 A | 7/1995 | Kyojima et al. |
| 5,822,454 A | 10/1998 | Rangarajan |
| 5,864,629 A | 1/1999 | Wustmann |
| 6,400,845 B1 | 6/2002 | Volino |
| 6,507,671 B1 | 1/2003 | Kagan et al. |
| 6,687,404 B1 | 2/2004 | Hull et al. |
| 6,694,053 B1 | 2/2004 | Burns et al. |
| 7,149,347 B1 | 12/2006 | Wnek |
| 7,171,615 B2 | 1/2007 | Jensen et al. |
| 7,225,197 B2 | 5/2007 | Lissar et al. |
| 7,310,635 B2 | 12/2007 | Tucker |

(Continued)

FOREIGN PATENT DOCUMENTS

WO    WO9847098    10/1998

*Primary Examiner* — Yon Couso
(74) *Attorney, Agent, or Firm* — LeighAnn Weiland; Aditya Krishnan

(57) ABSTRACT

Embodiments of the invention disclose techniques for processing of machine-readable forms of unfixed or flexible format. An auxiliary brief description may be optionally specified to determine the spatial orientation of the image. A method of searching for elements of a document comprises the following main operations in addition to the operations of preliminary image processing: selecting the varieties of structural description from several available variants, determining the orientation of the image, selecting the text objects, where the text must be recognized, and determining the minimal required volume of recognition, recognizing the text objects, searching for elements of the form. Searching for elements of the form comprises the following actions: selecting a searched element in the structural description, gaining the algorithm of search constraints from the structural description, searching for the element, testing the obtained variants.

46 Claims, 6 Drawing Sheets

(56) References Cited

U.S. PATENT DOCUMENTS

| | | |
|---|---|---|
| 7,346,215 B2 | 3/2008 | Shih |
| 2002/0059265 A1 | 5/2002 | Valorose, III |
| 2004/0006467 A1 | 1/2004 | Anisimovich et al. |
| 2004/0047508 A1 | 3/2004 | Anisimovich et al. |
| 2004/0114802 A1 | 6/2004 | Anisimovich et al. |
| 2004/0117738 A1 | 6/2004 | Anisimovich et al. |
| 2004/0190790 A1 | 9/2004 | Zuev et al. |
| 2004/0223197 A1 | 11/2004 | Ohta et al. |
| 2004/0264774 A1 | 12/2004 | Anisimovich et al. |
| 2006/0104511 A1 | 5/2006 | Guo et al. |
| 2006/0217956 A1 | 9/2006 | Nagao et al. |
| 2007/0172130 A1 | 7/2007 | Zuev et al. |
| 2008/0195968 A1 | 8/2008 | Schacht |
| 2008/0263021 A1 | 10/2008 | Zuev et al. |

USPTO PATENT FULL-TEXT AND IMAGE DATABASE

| Home | Quick | Advanced | Pat Num | Help |

| Hit List | Next | Bottom |

| View Cart | Add to Cart |

| Images |

( 1 of 1 )

United States Patent                                7,734,065
Anisimovich , et al.                            June 8, 2010

Method of text information recognition from a graphical file with use of dictionaries and other supplementary data

Abstract

The present invention deals with text comprising image parsed to graphemes. A result of character recognition is creation of one or more versions of characters for each grapheme. All possible words versions are obtained using all characters versions, and all parsing versions are examined. A supplementary data of several types is applied successively in the preliminarily prescribed order to the examined words. The processing with the use of supplemental data may be represented as a three times repeated processing of the same text fragment with the use of supplementary information becoming available at each time. The examination comprises three steps. 1) A set of chains LPG is built using all obtained recognized grapheme-to-character versions. 2) All obtained versions are analyzed with the successive application of subsequent supplemental data types in connection with the preliminarily assigned order or with a joint application thereof. 3) A supplementary space recognition correction.

Inventors: Anisimovich; Konstantin (Moscow, RU), Rybkin; Vladimir (Moscow, RU), Shamis; Alexander (Moscow, RU)
Assignee: ABBYY Software Ltd. (Nicosia, CY)
Appl. No.: 11/428,841
Filed: July 6, 2006

| | |
|---|---|
| Current U.S. Class: | 382/111 ; 382/171; 382/174; 382/176; 382/181 |
| Current International Class: | G06K 9/00 (20060101) |
| Field of Search: | 382/111,101,110,100,137,181,176,171,174 |

References Cited [Referenced By]

U.S. Patent Documents

| | | |
|---|---|---|
| 5390259 | February 1995 | Withgott et al. |
| 5680478 | October 1997 | Wang et al. |
| 5875263 | February 1999 | Froessl |

*Figure 5*

METHODS OF OBJECT SEARCH AND RECOGNITION

FIELD

Embodiments of the present invention relate generally to image recognition and particularly to the recognition of non-text and/or text objects contained in a bit-mapped image of a document.

BACKGROUND

A form is a structured document with one or more pages with fields to be completed. Typically, each field has an associated label or inscription stating the nature of the data the field should contain.

Two types of forms can be identified—fixed forms and flexible forms. A fixed form has the same positioning and number of fields on all of its copies and often has anchor elements (e.g. black squares or separator lines). A non-fixed or flexible form may have different number of fields which may be positioned differently from copy to copy. Examples of flexible forms include application forms, invoices, insurance forms, money order forms, business letters, etc.

Methods of structure assignment and document element search in an electronic graphical image are described in U.S. Pat. No. 5,416,849 but are limited to processing only fixed forms with no deviation in field arrangement.

SUMMARY

Embodiments of the present invention disclose improvements in searching capabilities as well as the accuracy of identification of obtained image objects, as they applied to flexible or unfixed format forms based on a flexible document structure.

Advantageously, the techniques disclosed herein have increased noise immunity during the process of object searching on flexible form images.

BRIEF DESCRIPTION OF THE DRAWINGS

FIG. 5 shows an example of a page of a document with non-fixed format.

DESCRIPTION

Figure 1:
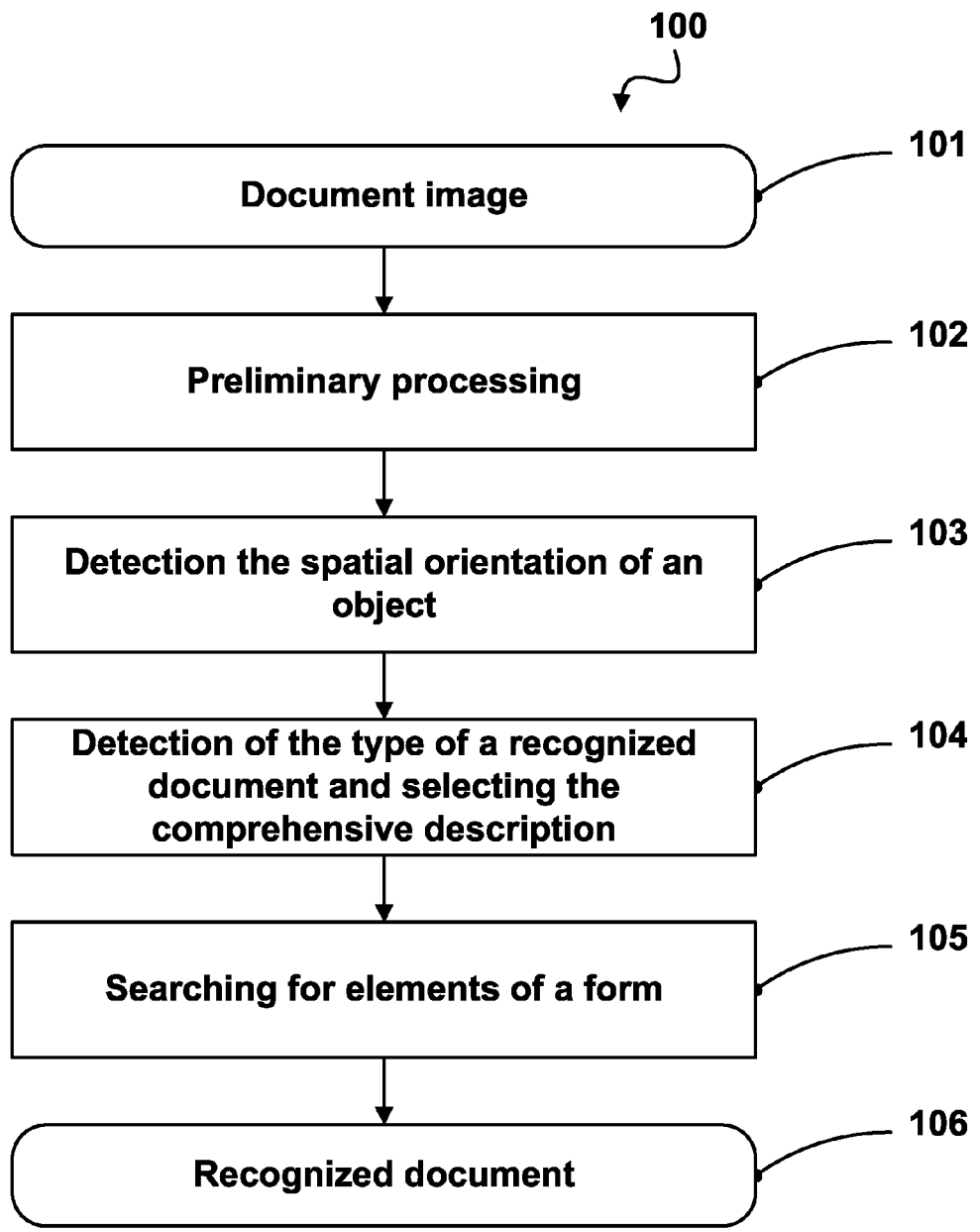
FIG. 1 shows a flow chart of document of unfixed format processing.
Figure 2:
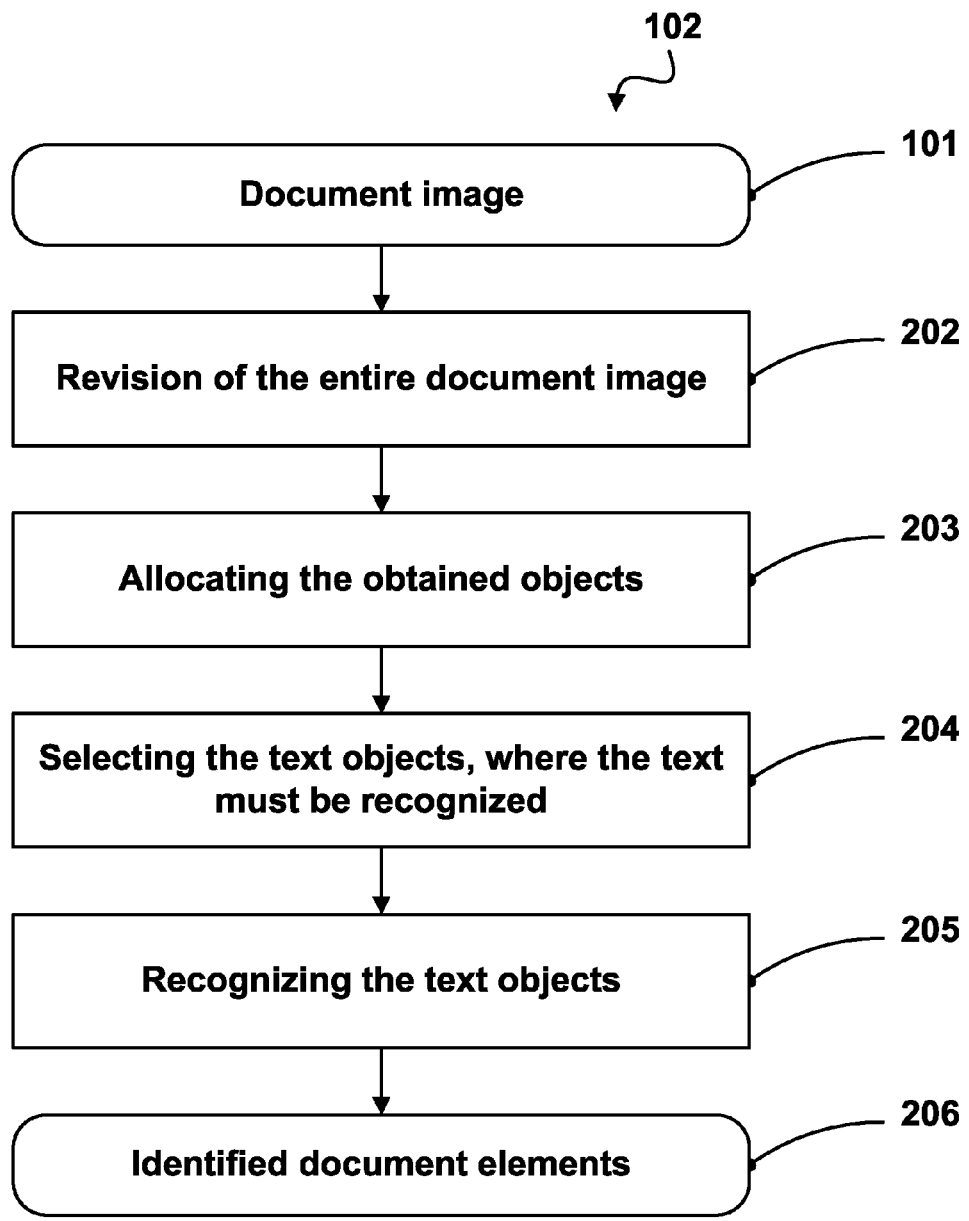
FIG. 2 shows a flow chart of preliminary image processing.
Figure 3:
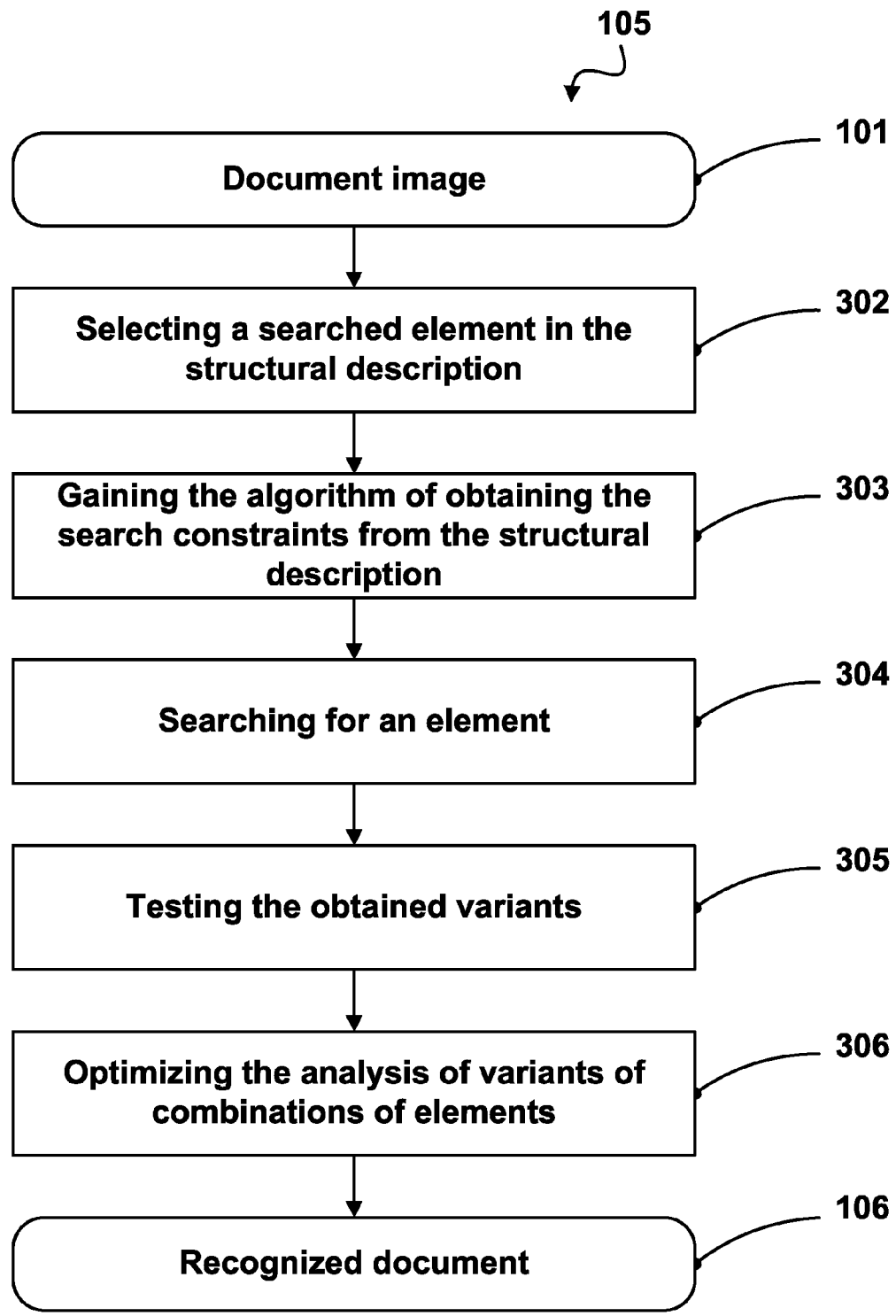
FIG. 3 shows a flow chart of searching for elements of a form.
Figure 4:
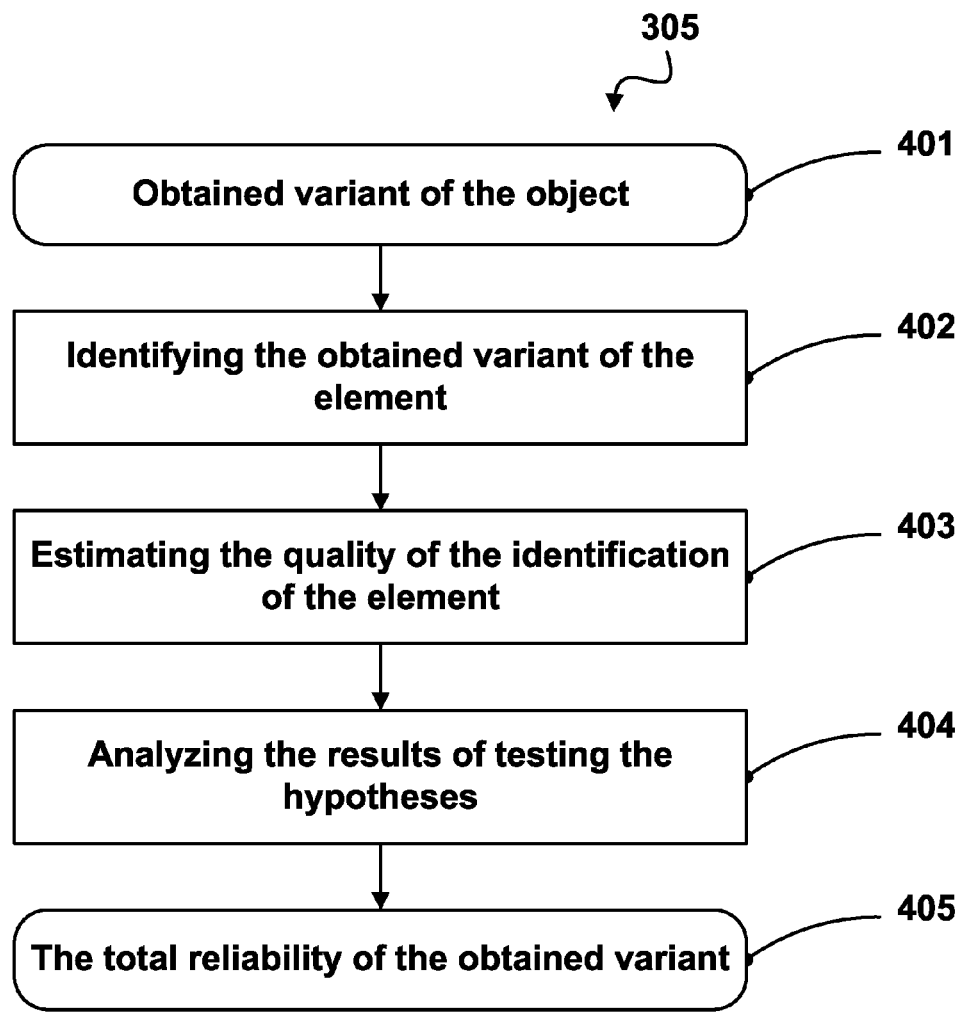
FIG. 4 shows a flow chart of testing the obtained variants.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention disclose techniques for search and identification of objects on an image (hereinafter "the disclosed techniques"). The search and identification of objects may be based on a structural description.

A flexible document structure, which is also referred to herein as a "structural description" or "flexible structural description", may comprise the description of spatial and parametric characteristics of document elements, and the logical connections between document elements.

In one embodiment, there may be evaluation of correspondence of the search result to the structural description. Numbers from 0 to 1 are used for the evaluation. The accuracy of evaluation may be $10^{-5}$ (ten to the power of minus five). In one embodiment the value equal to 1 means the absolute correspondence of the obtained result to the description. If the estimate differs from zero, the application of flexible structural description also comprises the stage of forming block regions, i.e. evaluation of the arrangement of the required fields on the basis of the information about the obtained objects.

The methods disclosed herein may be used in the recognition of data input forms, containing typographical and handwritten texts as well as a set of special text-marks for document navigation.

The term "documents" as used herein is to be interpreted broadly to include inquiry lists, questionnaires, bank documents with rigid or arbitrary arrangement of data fields, and the like.

The disclosed techniques may be used for recognition of predefined form objects contained in an electronic graphical image.

The disclosed techniques may include preliminarily assigning a document structure to an image being processed. Preliminary assignment of the document structure may comprise setting a description of the document's logical structure in the form of interdependences of spatial and parametric characteristic of elements, algorithms of obtaining the parameters of the search for each element, methods of identifying the obtained elements, methods of decreasing the number of obtained variants of an element, acceleration of the search for the best variant.

The disclosed techniques may include a method of searching and recognizing the elements (fields or field fragments) of a document on a graphical (bit-mapped) image based on a predefined logical structure of the document in the form of a structural description, algorithms of obtaining the parameters of the search for each element, methods of identifying the obtained elements, methods of decreasing the number of obtained variants of an element, acceleration of the search for the best variant.

In one embodiment searching for elements with the help of a flexible structural description is performed sequentially in the order in which they are described in the flexible structural description, top-down through the "tree" (hierarchy) of elements, in accordance with the logical structure of the document description. For each element in the assigned search area, several variants of image objects or sets of image objects corresponding to the description of the element in the structural description may be found. Various obtained variants of objects are considered to be the variants of the position of the element on the image. An estimate of the degree of correspondence of the variant to the element description is assigned to each obtained variant (i.e. the estimate of the quality of the variant).

In one embodiment, the accuracy of the obtained position of the object determines the accuracy of obtaining the positions of objects described further in the description relative to this object. Searching for the next dependent object is performed separately for each obtained variant of the current object. Therefore, the variants of objects obtained on the image comprise a hierarchical tree is considerable more branched than the hierarchical tree of elements in a structural description.

If an element or an object is compound, i.e. the element is a group of elements comprising several parts, then the whole group also represents an element, which requires generating several possible variants, the number of which corresponds to the number of complete chains of group sub-elements (dependent elements of a lower level). The chain is considered complete if all its obtained sub-elements (elements of a lower level) have sufficient quality. The total estimate of the quality of a variant of a compound element is calculated by multiplying the estimates of the quality of element variants forming the compound element. A flexible structural description as a whole also represents a compound element. Therefore, the quality of the correspondence of the variant to the flexible structural description is determined by multiplying the quality of its elements.

Application of a flexible structural description comprises searching for the best complete branch in the whole tree of variants, i.e. the branch that include all the elements, from first to last. A general solution of such a task implies taking into consideration all the possible combinations of hypotheses for all elements, construction of a total multitude of complete branches and selecting the best among them. However, in practice, such a solution requires too many resources, and is therefore impractical. Moreover, an abrupt increase in the number of variants taken into consideration is possible, caused by an increase in the number of elements and a lack of rigid restrictions on the search area and element parameters.

To limit the time required to analyze the variants, one of several methods of decreasing the volume is used.

Each element gets the maximum allowed number of acceptable variants, rated in the order of decreasing quality. These variants will be used in the further search, i.e. when searching for the next element. Any variants beyond this number will be discarded. Usually this number is 5 (five) for simple elements and 1 (one) for compound elements. This means that, if 15 variants are obtained for a simple element in the assigned search area, five variants with the best quality rating will be selected. Other 10 chains of variants will not be complete and will not be taken into consideration. A compound element is identified with a greater quality rating than a simple element, because the quality of identification is determined not only by multiplying the quality ratings of the constituent simple elements, but also by several additional (mainly qualitative) characteristics, such as mutual arrangement, object size, correspondence to the conditions of mutual arrangement several elements, and so on.

Since a compound element is identified with a greater quality rating than a simple element, its best variant usually turns out to be accurate.

The process of searching for objects almost always includes generating several incomplete chains of variants of obtained objects and, therefore, several directions of further search. Using an algorithm of "broad searching" performs a search for the best hypothesis, i.e. the search is always directed through the chain of variants that has the best quality rating at the current step, regardless of the length of the chain. For example, if in a flexible structural description of 30 elements 2 chains are obtained during search, one of which consists of 30 elements with the quality rating of 0.89 and the other chain has 2 elements with the quality rating of 0.92, then the second chain will be pursued until its total quality becomes lower than that of the first chain.

The following rule of quality optimization is used for compound elements: if an ideal complete chain for this element is obtained, i.e. the quality of the obtained chain equals 1, other variants of sub-elements composition of this compound element are not taken into consideration.

Moreover, the maximum number of variants for every element in the entire hypothesis tree is restricted to 1000.

A set of spatial and parametric characteristics sufficient for search for and identification of an element is used to describe elements of a document of a non-fixed format. A structural description consists of a description of spatial and/or parametric characteristics of the element, and a description of its logical connections with other elements.

Figure 6:
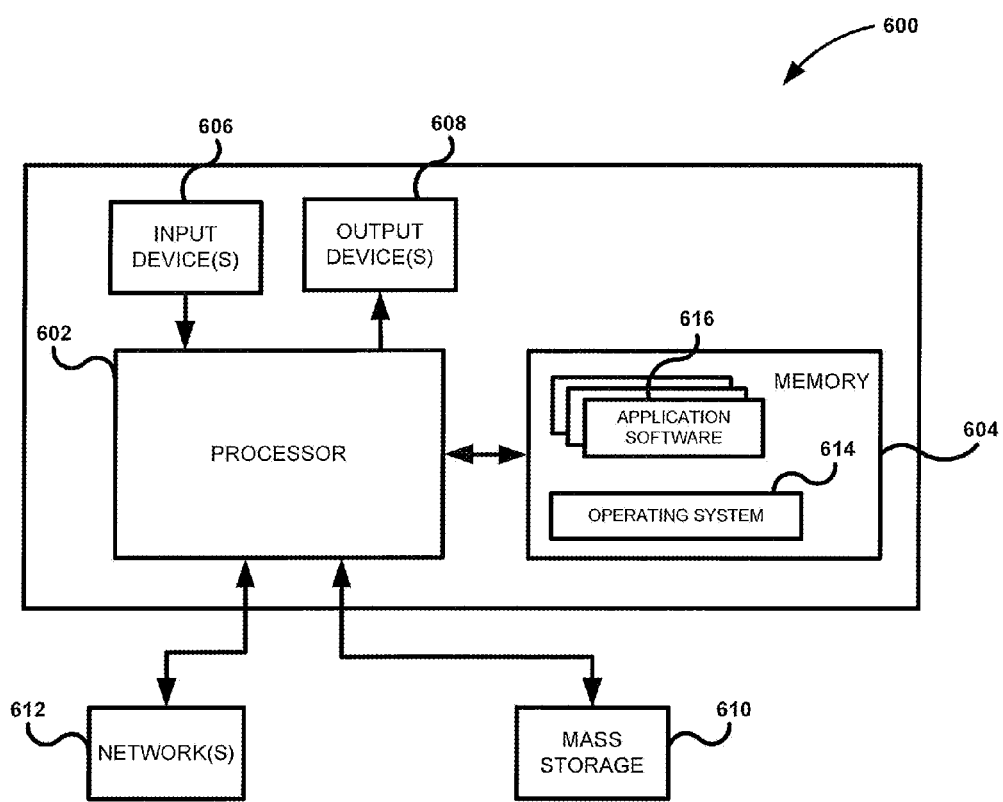
FIG. 6 shows an exemplary hardware for implementing methods represented by flow charts shown in FIGS. 1-4, in accordance with an embodiment of the present disclosure.

A good example of a document with a flexible or non-fixed format is shown in FIG. 6), where the regular elements are the fields for "Abstract", "Inventors:", "Appl. No.:" and etc, and variable elements are the content of the fields.

A flexible structural description may also additionally include all or some of the following conditions. The logical structure of a document is represented as a sequence of elements connected mainly by hierarchical dependences; an algorithm of determining the search parameters is set, spatial characteristics for searching for each element are specified, parametric characteristics of the searching for each element are set, the set of parameters for identifying a compound element on the basis of the aggregate of components is set, and an algorithm of estimating the quality of an obtained variant of an element is set.

A flexible structural description may also additionally include a separate brief structural description for determining the correct spatial orientation of the image.

A flexible structural description may also additionally include a separate brief structural description for determining the document type and selecting the corresponding comprehensive document description from several possible descriptions. A comprehensive description is created for each document type. If a document type does not have a brief description, then the comprehensive description of the document is used for selecting its type.

The structure of element connection is mainly realized as a hierarchical structure.

In one embodiment, the method of search and recognition (identification) of elements (fields) on an image (101) of non-fixed format corresponding to a form, comprises the following steps:

Searching and identifying (including recognition) the elements of a document with non-fixed format comprises at least the following preliminary actions (102).
  (1) Performing a recognition operation comprising:
  (a) Revision or analysis of the entire document image (202).
  (b) Allocation of a position (spatial location) for the detected objects or object fragments (203).
  (c) Performing an initial classification of the allocated objects according to the set of predefined types and selecting the text objects, where the text must be recognized (204).
  (d) Recognition of all or a part of text objects, where each object is recognized partially or entirely (205).

In one embodiment, to speed up the processing, recognition of text objects is performed to a minimum degree that is sufficient for identifying the document structure and other elements of the form (206).

(2) A separate structural description is set to detect the spatial orientation of an object (103). Such a description usually contains a brief set of structural elements which can be easily recognized on a document (form). Orientation is accepted as correct if the elements of the structural description coincide with the elements on the image with the best quality estimate.

(3) A corresponding separate brief description is set for quick detection of the type of a recognized document and selecting the comprehensive (main) description of the document type from several possible descriptions (104). A comprehensive description is created for each document type. If any document type does not have a brief description, then the comprehensive description of the document is used for selecting its type, and the selection of the document type is performed by comparing the quality estimates of the used (brief or comprehensive) descriptions of different types.

(4) Performing a searching operation (105) for elements of the form based on a structural description, including:
  (a) Choosing an element or the next element (302) in the structural description (starting from the first one).
  (b) Calculating or obtaining a predefined algorithm (303) for determining the search parameters or constraints.
  (c) Performing a search for an element (304), comprising at least the following operations:
  (d) Searching by using the spatial characteristics of the search area such as, for example, half-plane, rectangle, circle, polygon and others, or any combinations thereof;
  (e) Searching by using the parametric characteristics of an element (the type of element);
  (f) Searching with the help of the results of preliminary text recognition;
  (g) Searching by using the spatial characteristics of an element, represented as absolute coordinates and/or coordinates relative to the other elements (located higher in the tree). The coordinates may be specified as exact values or as an interval.
  (h) Calculating the quality of correspondence of the obtained variant to the description of the required element.
  (i) Testing (305) the obtained variants of the object (401) comprises the following operations.
  (j) Identifying the obtained element variant (402);
  (il) Calculating the quality of the identification of the element (403);
  (m) Analyzing the results of testing the hypotheses (404) about the presence and completeness of the composition of the element and the types of composite parts, analyzing of the correspondence of a compound element to the hypothesis about the type of the element;
  (n) Calculating the total reliability of the obtained variant (405).
  (o) Optimization (306) of revision of element combination variants comprises;
  (p) Assigning to each type of the element several variants with the best quality rating, which are kept for further analysis;
  (q) Searching for the best variant of a compound element, taking into account the best total quality estimate of composite parts, regardless of their number;
  (r) Revision of the quality estimates of the variants which were discarded earlier in order to find any quality estimates which would be higher than the current one.
  (s) If the total quality estimate is lower than the predefined level, searching for the next variant of the same element and calculating its total quality estimate are performed.
  (t) If the total quality estimate is higher than the predefined level, searching for the next element is performed.
  (u) The variant with the maximum total quality estimate is selected.
  (v) Searching for the best variant of a compound element is performed, taking into account the best total quality estimate of accountable composite parts, regardless of their number.

The quality of a variant as supposed herein is the estimation which indicates the degree of correspondence of the obtained variant to the present element (its properties and search constraints). The numerical constituent of the quality of a variant is a number ranging from 0 to 1. The quality of a hypothesis for a compound element is calculated by multiplying the quality estimates of the hypotheses of all the sub-elements thereof.

The quality of a variant is a result of multiplication of the quality of the element, assigned at the stage of specification of the structural description during the specification of the element type, and the quality of the element (object), variant is calculated at the stage of the search. The total quality of the variant is calculated as a product of quality ratings of all interdependent composing elements in the chain, from the first element in the structural description to the current element.

For optional elements i.e. such elements, which may be missing on a document, a "zero" variant of an element is used, if the element has not been detected. A "zero" variant supposes that the required object is missing in the search area. A "zero" variant is formed, if no objects are detected corresponding to the optional element and having the quality estimate which is greater than the quality of the zero variant. If the zero variant is selected as the most appropriate, the process is started of searching and identifying the next element in the list (including the elements which depend on the element which has not been obtained), or analyzing one of the earlier rejected variants of the same element or another element, simultaneously taking appropriate measures to avoid creating an infinite loop in the process.

If no objects are detected corresponding to the optional element, the use of the flexible description is not stopped. Instead, a zero variant is generated which gains the quality value predefined by the user in the description of this optional element.

Creation of the flexible structural description uses the following main types of elements conventionally divided into the following: simple element which do not contain other elements: Static Text, Separator, White field, Barcode, Text String, Text Fragment, Set of objects, Date, Phone Number, Currency, and Table, and compound elements—Group, and some other types.

Static text, as supposed herein, is an element of structural description describing a text with the known meaning. The text may consist of one word, of several words, or of an entire paragraph. "Several words" differs from "a word" by the presence of at least one blank space or another inter-word separator, depending on the language, for example, a full stop, a comma, a colon, or any other punctuation mark. Several words may take up several text strings.

Separator, as supposed herein, is an element representing a vertical or horizontal graphical object between other objects. A solid line or a dotted line can represent a separator, for example.

White field, as supposed herein, is an element of description representing a rectangular region of an image that does not contain any objects within it.

Barcode, as supposed herein, is an element of flexible description representing a line drawing that codes numerical information.

Text string, as supposed herein, is an element representing a sequence of characters located on a single line one after another. Character strings can consist of text objects, for example, words, or of fragments of text objects.

Text fragment, as supposed herein, is an element representing an aggregate of text objects.

Set of objects (of the specified type), as supposed herein, is an element representing an aggregate of different types of objects on an image where each object meets the search constraints.

Date as supposed herein, is an element representing a date.

Telephone number, as supposed herein, is an element representing a telephone number which may be accompanied a by prefix ("tel.", "home tel.", etc.) and by a code of the city/region, which is separated from the number by brackets.

Currency, as supposed herein, is an element of description representing money sums, where the name of the currency can be used as the prefix.

Table, as supposed herein, is an element of flexible description representing data in the form of a table.

Compound element (element group), as supposed herein, is an aggregate of several elements (sub-elements). Sub-elements may be simple or compound.

Compound elements are used for:

joining elements into a group. Each of these compound elements may contain smaller compound elements which search for smaller fragments of the element;

providing the logical hierarchy of elements for better navigation through the structural description;

reducing the number of possible variants of the element in order to speed up the search for the resulting variant. Joining elements into a compound element allows to analyze this set of sub-elements as a single entity which has its own complete variant (consisting of the variants of the sub-elements) and a total estimate of reliability of the entire group. Revision of possible combinations of variants of the sub-elements is performed within the group, and only a predefined number of the best variants in the group take part in the further analysis and search for the next elements. The number of the best variants of a compound element which take part in further searching is usually 1;

specifying restrictions of the search area which are common for all the sub-elements. The search area of a certain sub-element in this case is calculated as the intersection of the search area set for the sub-element itself and the search area of the group which contains this sub-element.

FIG. 6 of the drawings shows hardware 600 that may be used to implement the disclosed techniques, in accordance with one embodiment of the disclosure. Referring to FIG. 6, the hardware 600 typically includes at least one processor 602 coupled to a memory 604. The processor 602 may represent one or more processors (e.g. microprocessors), and the memory 604 may represent random access memory (RAM) devices comprising a main storage of the hardware 600, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware 600, e.g. any cache memory in the processor 602 as well as any storage capacity used as a virtual memory, e.g., as stored on a mass storage device 610.

The hardware 600 also typically receives a number of inputs and outputs for communicating information externally. For interface with a user or operator, the hardware 600 may include one or more user input devices 606 (e.g., a keyboard, a mouse, imaging device, scanner, etc.) and a one or more output devices 608 (e.g., a Liquid Crystal Display (LCD) panel, a sound playback device (speaker)). To embody the present disclosure, the hardware 600 must include at least one touch screen device (for example, a touch screen), an interactive whiteboard or any other device which allows the user to interact with a computer by touching areas on the screen.

For additional storage, the hardware 600 may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 600 may include an interface with one or more networks 612 (e.g., a local area network (LAN), a wide area network (WAN), a wireless network, and/or the Internet among others) to permit the communication of information with other computers coupled to the networks. It should be appreciated that the hardware 600 typically includes suitable analog and/or digital interfaces between the processor 602 and each of the components 604,606,608, and 612 as is well known in the art.

The hardware 600 operates under the control of an operating system 614, and executes various computer software applications, components, programs, objects, modules, etc. to implement the techniques described above. In particular, the computer software applications will include the client dictionary application, in the case of the client user device 102. Moreover, various applications, components, programs, objects, etc., collectively indicated by reference 616 in FIG. 6, may also execute on one or more processors in another computer coupled to the hardware 600 via a network 612, e.g. in a distributed computing environment, whereby the processing required to implement the functions of a computer program may be allocated to multiple computers over a network.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the disclosure. Moreover, while the disclosure has been described in the context of fully functioning computers and computer systems, those skilled in the art will appreciate that the various embodiments of the disclosure are capable of being distributed as a program product in a variety of forms, and that the disclosure applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CO-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A system comprising:
    a processor; and
    a memory coupled to the processor, wherein the memory stores instructions which when executed by the processor cause the system to:
        detect, via instructions operating on a computing device, objects in an electronic image of a form;
        allocate a position for each object in the electronic image;
        select text objects;
        recognize text within the text objects; and
        search for elements in the electronic image of the form based on a structural description of the form, wherein to perform said search the instructions cause the system to:
            select an element in the structural description for the searching operation;
            determine an algorithm for determining search constraints for the searching operation;
            determine search constraints using the determined algorithm; and
            search for the element using one or more of the search constraints, wherein to search for the element the instructions cause the system to:
                search using a spatial characteristic of a search area for the element;
                search using a parametric characteristic of the element;
                search using an absolute or relative spatial characteristic of the element;
                search using a result of said text recognition within the text objects;
                identify variants of the element; and
                estimate, for the obtained variants of the element, a degree of correspondence of the respective variants to the element description.

2. The system of claim 1, wherein the recognition is performed to a predefined minimum degree that is sufficient for identifying a document structure for the form.

3. The system of claim 1, wherein the instructions further cause the system to:
    determine an orientation of the electronic image.

4. The system of claim 3, wherein all or a part of the objects of the structural description are used to determine the orientation of the electronic image.

5. The system of claim 3, wherein the orientation of the electronic image is determined by evaluating a coincidence of objects in the electronic image with those in the structural description.

6. The system of claim 3, wherein an auxiliary description in brief form is used to determine the orientation of the electronic image.

7. The system of claim 4, wherein the instructions further cause the system to calculate a quality rating in relation to a coincidence of the objects of the electronic image relative to objects of the description, wherein determination of the orientation of the electronic image is based on a sufficiently high quality rating such that a sufficiently high quality rating indicates a correct orientation of the electronic image.

8. The system of claim 1, wherein the instructions further cause the system to:
    select a type of the form from several types; and wherein the structural description of the form is based on said selected type.

9. The system of claim 8, wherein an auxiliary description in a brief form is used to determine the form type; and wherein the instructions further cause the system to select a structural description from several structural descriptions.

10. The system of claim 8, wherein the form type which corresponds to the current electronic image is selected based on a comparison of quality estimates of the structural descriptions.

11. The system of claim 1, wherein one or more of the following spatial characteristics of the search area are used: a half plane, a rectangle, a circle, a polygon, or a combination thereof.

12. The system of claim 1, wherein quality ratings of variants are analyzed after generation of a total quality rating for each respective variant for the electronic image; and wherein the instructions further cause the system to: select a variant with a best quality rating.

13. The system of claim 1, wherein the search for a next object is performed when there are no variants for a current element or when a total quality rating is lower than a predefined level.

14. The system of claim 1, wherein to search for elements in the electronic image of the form based on a structural description of the form the instructions further cause the system to:
    estimate a total reliability for each of the obtained variants.

15. The system of claim 1, wherein to search for elements in the electronic image of the form based on a structural description of the form the instructions further cause the system to:
    analyze variants of combinations of elements, wherein to analyze the variants the instructions further cause the system to:
        generate a quality rating for each variant;
        assign, to each type of element, variants with a quality rating that exceeds a threshold for further analysis; and
        search for a variant of the element using a total quality rating of its composite parts.

16. The system of claim 15, wherein to search for elements in the electronic image of the form based on a structural description of the form the instructions further cause the system to:

analyze quality estimates of variants that previously had a quality rating that failed to exceed the threshold.

17. The system of claim 1, wherein the instructions further cause the system to:

test hypotheses about the presence or completeness of composition or types of composite parts of the element; and analyze a correspondence of the composite parts to a hypothesis about the type of the element.

18. The system of claim 1, wherein one or more variants of a compound element which have a best quality estimate are used for further analysis.

19. The system of claim 1, wherein two or more variants of an element which have a best quality estimate are used for further analysis.

20. The system of claim 1, wherein the instructions further cause the system to:

search for an object corresponding to a next element of the structural description when no objects are detected in a region of the electronic image which is specified for a current element.

21. The system of claim 1, wherein the instructions further cause the system to:

confirm that if an optional element is missing in a designated search area in the electronic image then to form a hypothesis of zero value for the optional element.

22. The system of claim 21, wherein the optional element with zero value is used for searching a next element.

23. The system of claim 1, wherein recognizing text within the text objects is performed to a predefined degree sufficient for identifying a structural description for the form.

24. A non-transitory computer-readable medium having stored thereon a sequence of instructions which when executed by a system, causes the system to perform steps comprising:

detecting, via instructions operating on a computing device, objects in an electronic image of a form;

allocating a position for each object in the electronic image;

selecting text objects;

recognizing text within the text objects; and searching for elements in the electronic image of the form based on a structural description of the form, wherein said searching includes:

selecting an element in the structural description for the searching operation;

determining an algorithm for determining search constraints for the searching operation;

determining search constraints using the determined algorithm; and searching for the element using one or more of the search constraints wherein searching for the element includes:

searching using a spatial characteristic of a search area for the element;

searching using a parametric characteristic of the element;

searching using an absolute or relative spatial characteristic of the element;

searching using a result of said text recognition within the text objects;

identifying variants of the element; and estimating, for the obtained variants of the element, a degree of correspondence of the respective variants to the element description.

25. The non-transitory computer-readable medium of claim 24, wherein the recognition of text within the text objects is performed to a predefined minimum degree that is sufficient for identifying a document structure for the form.

26. The non-transitory computer-readable medium of claim 24, wherein the instructions further cause the system to perform the step of:

determining an orientation of the electronic image.

27. The non-transitory computer-readable medium of claim 26, wherein all or a part of the objects of the structural description are used to determine the orientation of the electronic image.

28. The non-transitory computer-readable medium of claim 26, wherein the orientation of the electronic image is determined by evaluating a coincidence of objects in the electronic image with those in the structural description.

29. The non-transitory computer-readable medium of claim 26, wherein an auxiliary description in brief form is used to determine the orientation of the electronic image.

30. The non-transitory computer-readable medium of claim 27, wherein the instructions further cause the system to perform the step of calculating a quality rating in relation to a coincidence of the objects of the electronic image relative to objects of the description, wherein determining the orientation of the electronic image is based on a sufficiently high quality rating such that a sufficiently high quality rating indicates a correct orientation of the electronic image.

31. The non-transitory computer-readable medium of claim 24, wherein the instructions further cause the system to perform the step of:

selecting a type of the form from several types; and wherein the structural description of the form is based on said selected type.

32. The non-transitory computer-readable medium of claim 31, wherein an auxiliary description in a brief form is used to determine the form type; and wherein the instructions further cause the system to perform the step of selecting a structural description from several structural descriptions.

33. The non-transitory computer-readable medium of claim 31, wherein the form type which corresponds to the current electronic image is selected based on comparing quality estimates of the structural descriptions.

34. The non-transitory computer-readable medium of claim 24, wherein one or more of the following spatial characteristics of the search area are used: a half plane, a rectangle, a circle, a polygon, or a combination thereof.

35. The non-transitory computer-readable medium of claim 24, wherein quality ratings of variants are analyzed after generating a total quality rating for each respective variant for the electronic image; and wherein the instructions further cause the system to perform the step of: selecting a variant with a best quality rating.

36. The non-transitory computer-readable medium of claim 24, wherein searching for a next object is performed when there are no variants for a current element or when a total quality rating is lower than a predefined level.

37. The non-transitory computer-readable medium of claim 24, wherein the searching for elements in the electronic image of the form based on a structural description of the form further includes:

estimating a total reliability for each of the obtained variants.

38. The non-transitory computer-readable medium of claim 24, wherein the searching for elements in the electronic image of the form based on a structural description of the form further includes:
   analyzing variants of combinations of elements, wherein said analyzing variants includes:
      generating a quality rating for each variant;
      assigning, to each type of element, variants with a quality rating that exceeds a threshold for further analysis; and
      searching for a variant of the element using a total quality rating of its composite parts.

39. The non-transitory computer-readable medium of claim 38, wherein the searching for elements in the electronic image of the form based on a structural description of the form further includes:
   analyzing quality estimates of variants that previously had a quality rating that failed to exceed the threshold.

40. The non-transitory computer-readable medium of claim 24, wherein the instructions further cause the system to perform steps comprising:
   testing hypotheses about the presence or completeness of composition or types of composite parts of the element; and
   analyzing a correspondence of the composite parts to the hypothesis about the type of the element.

41. The non-transitory computer-readable medium of claim 24, wherein one or more variants of a compound element which have a best quality estimate are used for further analysis.

42. The non-transitory computer-readable medium of claim 24, wherein two or more variants of an element which have a best quality estimate are used for further analysis.

43. The non-transitory computer-readable medium of claim 24, wherein the instructions further cause the system to perform the step of:
   searching for an object corresponding to a next element of the structural description when no objects are detected in a region of the electronic image which is specified for a current element.

44. The non-transitory computer-readable medium of claim 24, wherein the instructions further cause the system to perform the step of:
   confirming that if an optional element is missing in a designated search area in the electronic image and then to form a hypothesis of zero value for the optional element.

45. The non-transitory computer-readable medium of claim 44, wherein the optional element with zero value is used for searching a next element.

46. The non-transitory computer-readable medium of claim 24, wherein recognizing text within the text objects is performed to a predefined degree sufficient for identifying a structural description for the form.

* * * * *